Oct. 16, 1951 G. S. WING 2,571,641
QUICK RELEASE, LOCKING TYPE, SHEAR
LOAD BEARING FASTENER
Filed March 18, 1949 2 SHEETS—SHEET 2

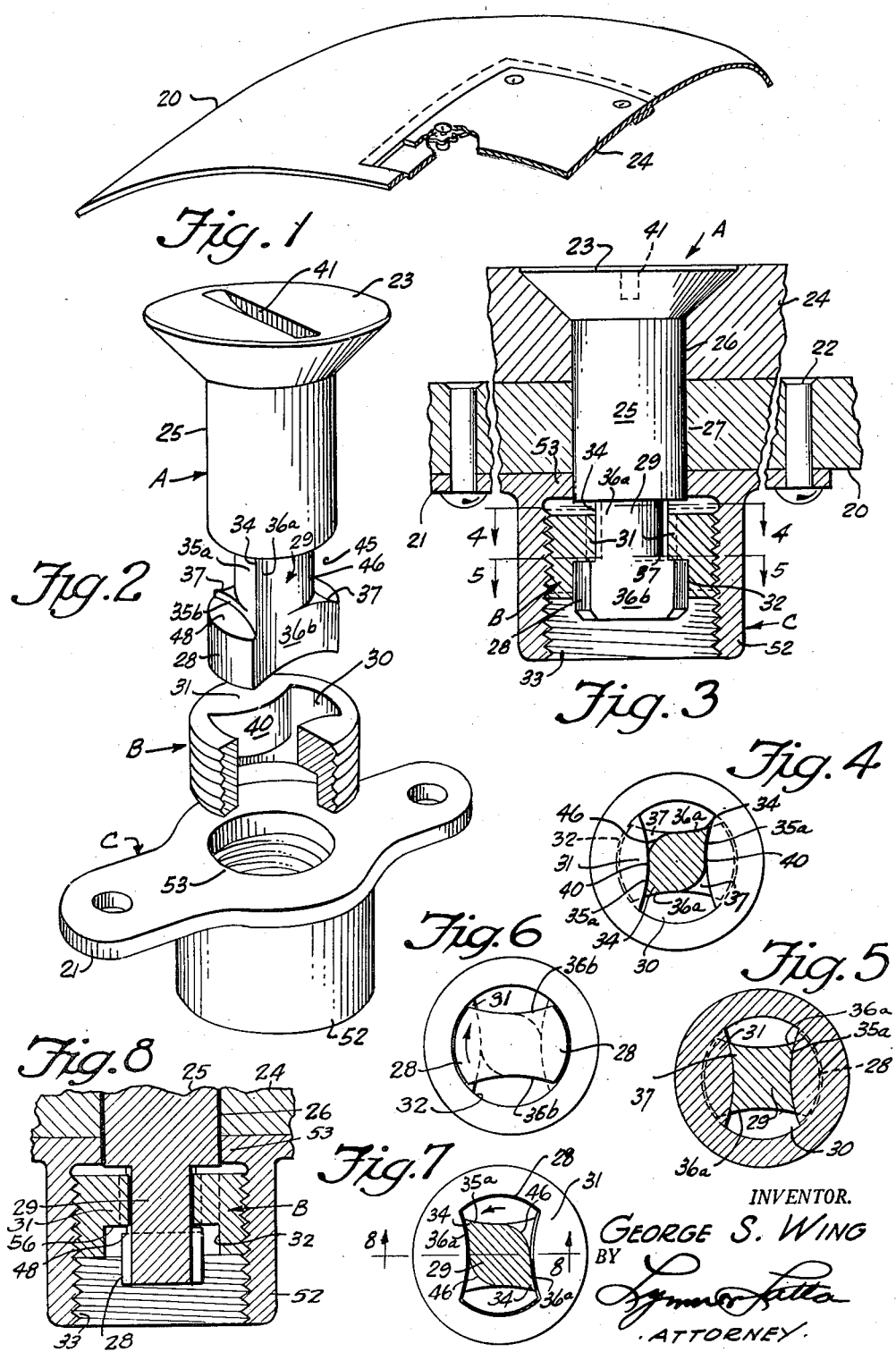

INVENTOR.
GEORGE S. WING
BY
Lynn Latta
ATTORNEY

Patented Oct. 16, 1951

2,571,641

UNITED STATES PATENT OFFICE 2,571,641

QUICK RELEASE LOCKING TYPE SHEAR LOAD BEARING FASTENER

George S. Wing, Hermosa Beach, Calif.

Application March 18, 1949, Serial No. 82,196

11 Claims. (Cl. 85—1)

This invention provides a fastening device of the quick release type which possesses at once the advantages of high shear strength, high tensile strength, self adjustment through wide variations in work thickness, positive locking against severe vibration or repeated load reversal, ease of installation, light weight, and manufacturability.

While there are many uses for this fastener, an example of the critical need for a device possessing the above combined features is evident in the design and construction of aircraft. Modern aircraft structure is of the stressed skin type. Internal servicing is achievable only through holes cut through the load carrying structure that range from a small hand size inspection, or adjustment port, to very large cutouts necessary for the removal of fuel tanks and other primary components.

Access holes may, at the designer's discretion, be either non-structural or structural. With the non-structural type no attempt is made through the cover plate to carry load other than that imposed locally by the air. The load must go around the hole, and the surrounding structure must possess strength ample to support the added burden. This is costly from the point of weight and space, but currently offers the advantage of permitting the use of either quick acting fasteners of the type generally referred to as cowling fasteners or a pattern of relatively widely spaced screws and nut plates. Thus the cover may be removed and attached quickly, thereby facilitating service.

Access holes of the structural type provide a covering means capable of carrying the load across the cutout area, thus the directional flow of load is undisturbed, and the entire surface is put to work. High loads and tight space limitation have, in the majority of instances, made the structural access door mandatory in high speed aircraft, particularly in the supersonic class.

The current disadvantage of structural access hole covering lies in the weakness of available methods of attachment. None of the commercially available quick acting (cowling type) fasteners possess the ability to hold the cover against other than relatively light air loads. They are weak in tension and incapable of supporting the transfer of shear from the adjoining structure. The successful transfer of load requires closely spaced high shear strength, high tensile strength fasteners placed through close fitting matching holes. This is customarily achieved through screws and nut plates. Since an aircraft screw (e. g. ¼" dia. size) requires twelve turns, or 4,320 degrees of rotation to remove or install, the time required to remove and replace structural cover plates is so great as to place a high price on serviceability in return for their favorable structural advantages.

With these problems in mind, a primary object of the invention is to provide a quick release fastener having a high load bearing capacity, both in shear and in tension, adapted to provide a non-yielding connection between structural members.

The most commonly employed cowl fastener for airplanes is one which utilizes a spring mounted transverse locking bar cooperating with bayonet slots in a stud which is rotatable to effect interlock and release of the stud with reference to the locking bar. An objection to this type of fastener is its yielding characteristic which makes it possible for it to become broken under high pressures applied between the members which it secures together. For this reason, it is not at present considered satisfactory for fastening the cowling of high speed aircraft, such as those of the jet propelled type, and there is a definite demand for a quick release fastener of a positive locking type. An object of my invention is to provide a fastener having all of the quick release advantages of prior fasteners while eliminating the disadvantages of the yielding characteristic and incorporating a positive lock principle.

I am of course aware that positive lock, quick release fasteners have been hitherto proposed. However, such earlier devices have not been generally satisfactory and have not gone into commercial use. One of the specific objects of my invention is to provide a positive lock, quick release fastener that can be fully relied upon to remain locked until unlocked by manual actuation; that will securely hold a pair of members together tightly; that can always be depended upon to readily release when actuated; that can be locked and unlocked in a minimum of time; that lends itself readily to manufacture in quantity; and that is capable of being manufactured at a reasonably moderate cost.

A further object of the invention is to provide a quick release fastener providing maximum adjustment for variations in thickness of materials to be secured together. Conventional fasteners must be made in a large number of sizes each capable of securing together only a single aggregate thickness of material. The tolerances between the head and the locking bar of such a device are fairly critical, so much so that the gradual weakening of the spring mount of a locking bar over a period of use may render the device unsatisfactory. In contrast to that, the present invention provides for an automatic take-up of all clearances between the parts being secured together, utilizing a nut and screw principle, and the amount of take-up is such that one fastener may adjust itself to a range of thicknesses varying by as much as 1/8 inch. Thus it becomes possible to provide the fasteners in sizes which vary in 1/8 inch increments and to thereby provide for fastening any selected aggregate thickness within a given range.

In one of the earlier attempts to provide a quickly separable fastener of the general type contemplated by my invention, it has been proposed to utilize a pin threaded into a nut which is provided with means to effect a separable interlocking connection with a cooperating fastener element that is affixed to one of the members to be secured together. An object to this proposal is the large size of the aperture through which the nut must be passed in effecting connection and release of the members. Another prior proposal utilizes a nut secured to one member, a screw threaded into the nut and having a projecting pin provided with bayonet keys, and a hollow cooperating fastener member having bayonet slots to receive the keys. Objections to this proposal are: (a) it does not lend itself to inexpensive manufacture in quantity, and (b) it is too large in proportion to its strength.

In contrast to these prior proposals, neither of which has gone into commercial use, my invention provides a fastener that is very compact and is capable of being reproduced in quantity with extreme accuracy and at moderate expense. In general, the invention differs from these prior devices in utilizing a screw element that is in the form of a collar having within its periphery one or more jaws defining a non-circular opening through which is passed the bayonet head of a locking pin which, when rotated, engages the collar and screws it tight within a fixed nut into which the screw element is threaded, and thereby establishes locking engagement with the jaw or jaws.

Another object of my invention is to provide a fastener having an improved locking mechanism.

Another object is to provide a separable fastener embodying a novel and improved characteristic providing for braking action between rotatable and non-rotatable parts thereof, to effectively prevent accidental unlocking of the fastener under the effect of vibration.

Other objects will become apparent in the ensuing specification and appended drawings in which:

Fig. 1 is a perspective view of a structural section secured by fasteners embodying my invention;

Fig. 2 is an exploded perspective view of a fastener embodying my invention;

Fig. 3 is an axial sectional view of the fastener;

Fig. 4 is a transverse sectional view of the pin and screw assembly taken on the line 4—4 of Fig. 3;

Fig. 5 is a transverse sectional view of the same taken on the line 5—5 of Fig. 3;

Fig. 6 is an end view of the pin and screw assembly;

Fig. 7 is a transverse sectional view of the pin and screw assembly taken in the same plane as Fig. 4, illustrating the unlocking position of the parts;

Fig. 8 is an axial sectional view of the fastener with the parts in the position of Fig. 7, taken as indicated by the line 8—8 of Fig. 7;

Figure 9:
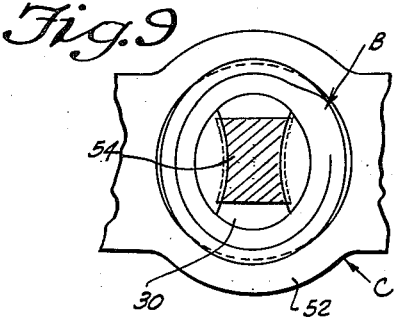
Fig. 9 is a view illustrating the braking principle that is employed for resisting rotation of the screw in the nut and indicating the method of assembly of the screw in the nut.

As an example of one form in which the invention may be embodied, I have shown in Figs. 1–15 a fastener embodying three parts, namely, a pin A, a screw B, and a nut C into which the screw B is threaded. The nut C functions as a fixed anchor member and is secured to one of the members to be attached together, e. g., a sheet or plate member 20. To this end, the nut C may be provided with one or more ears 21, apertured to receive rivets 22 by means of which the nut may be riveted to the member 20.

The pin A has a head 23 to engage the member 24 of the two members that are to be secured together, and has a shank portion 25 adapted to be passed through registering openings 26 and 27 in the members 24 and 20. The other end of the pin A has locking means receivable in and cooperable with the screw B to effect fastening.

The screw B is of collar form, and the locking pin passes through it. This provides the following combination of advantages: (a) The shank 25 of the pin may snugly fit openings 26 and 27 of members 20 and 24, to take shear stresses (b) the pin and screw will collectively occupy all of the space within the nut C except that providing for travel of the screw in the nut, and consequently, the fastener is of maximum combined compactness and strength, and (c) the screw may have expanding engagement with the nut to provide self-locking braking action as explained hereinafter.

Figure 15:
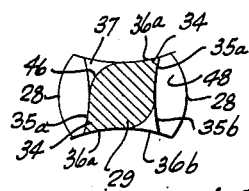
Fig. 15 is a transverse sectional view through the locking pin, showing the locking end thereof.

The locking end of the pin A, which is broadly of the bayonet type, acquires its fastening characteristic primarily from a non-circular cross-sectional shape, shown most clearly in Fig. 15. Its primary fastening means comprises a pair of keys 28 projecting radially from a reduced neck portion 29 which connects them to the shank 25. The keys 28 are adapted to pass through a non-circular aperture 30 in the screw collar B and to engage beneath jaws 31 projecting inwardly from the bore 32 of the screw B and defining the sides of the aperture 30.

The screw B has external threads mating with internal threads 33 in the nut C. In the locking operation, the locking end of pin A is inserted through the opening 30 between jaws 31 of screw B and the pin is then rotated in a locking direction (which ordinarily would be a clockwise direction corresponding to the customary direction of rotation for tightening any screw or bolt or the like). After making a small portion of a rotative turn, the pin establishes driving engagement with the screw, and further rotation of the pin in the same direction will advance the screw in the nut C until the jaws 31 engage the keys 28 (Figs. 3 and 6). Further rotative torque applied to the pin will result in cinching the members 20 and 24 between the nut C and the head 23 of the pin A.

The rotative drive between the pin A and the screw B is provided for by stops in the form of wings 34 formed integrally with and projecting radially from the reduced neck 29. The wings 34 have driving faces 35a which bear against the sides of the jaws 31 to transmit forward drive from the pin to the screw, and have reverse check faces 36a which stop against the side walls 40 of jaws 31 (as shown in Fig. 7) for transmitting retrograde rotation to the screw B. This will be elaborated upon hereinafter.

Figure 14:
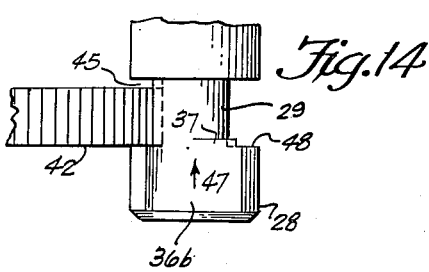
Fig. 14 is a side view illustrating a subsequent step in the manufacture of the locking pin.

The restricted rotation of the pin relative to the screw between the limits determined by engagement of a face 35a against a jaw on one side of the screw and engagement of a face 36a against the jaw on the other side of the screw (a quarter turn in the device illustrated in Figs. 1 to 8 inclusive) is possible only when the screw has been backed away from the position of inter-engagement between keys 28 and jaws 31. In the locked position of the parts, relative rotation between the pin and screw is completely prevented by the cooperative action of wings 34 and a pair of dogs 37 (most clearly shown in Fig. 2) stepped axially from the keys 28 and projecting radially from the reduced neck 29 in positions at approximately 90 degrees about the circumference of the pin A from the wings 34. The dogs 37 and wings 34 are adapted to collectively span the opening 30 transversely thereof and to coact with jaws 31 to lock the pin and screw in non-rotatable relation to each other (Fig. 5). The dogs 37 are drawn into the opening 30 by the advancing movement of screw B as the pin A is rotated in the locking direction. The engagement of faces 35a of wings 34 against jaws 31 automatically indexes the dogs 37 for entry into the opening 30, so that there is no possibility of the dogs 37 engaging beneath the jaws 31 when the fastener pin is being rotated in the locking direction (Fig. 14).

With the fastener locked, the dogs 37 function to lock the parts against accidental loosening under vibration, since the pin A is held against rotation relative to the screw B and the screw B in turn is frictionally held against undesired rotation in the nut C.

The frictional holding of screw B against rotation within nut C may be provided for by known braking means such as the deformable braking ring of yielding material employed in the self locking nut commonly known as the "Elastic stop nut." Rings, inserts or plugs of yielding material such as fibre, rubber or the like may be employed. However, such devices are affected by heat, humidity and age, and are expensive, and I prefer to establish the braking action to prevent free rotation of the screw B within the nut C by spring pressure set up between the threads of the nut and screw. To this end, the screw B, after having been fabricated to a circular shape, may be subjected to a deforming pressure between diametrically opposed points so as to impart to it an elliptical shape as shown in Fig. 9. It is to be understood that for the purpose of visual illustration of this characteristic, the departure of the screw from a true circular shape has been considerably exaggerated in Fig. 9. After having thus been deformed, the screw is hardened and finished, is then restored to a circular shape by the insertion of a suitable spreading tool 54 into the opening 30, and is then inserted into the nut C, which it continuously engages with a yielding, expanding force so as to require the application of considerable torque to the screw in order to rotate it in the nut. Free rotation, induced by vibration, is completely restrained. Consequently, with the pin A locked within the screw by the inter-engagement of wings 34 and dogs 37 with the jaws 31, the screw will effectively restrain any accidental or otherwise undesirable retrograde rotation of the pin A, thus indefinitely locking the fastener against loosening accidentally.

In releasing the fastener, the pin A is rotated in the direction opposite the locking direction. During the first stage of such unlocking rotation, the dogs 37 will transmit retrograde rotation to the screw B, and the retrograde rotation of the screw in the nut C will back the screw away from the keys 28 until the dogs 37 have been withdrawn from the opening 30. The jaws 31 will then clear the dogs 37 and in the next 90 degrees of rotation, the pin A will rotate freely within the screw B to pick up the lost motion provided for by the movement of wings 34 from the positions of engagement of the driving sides 35a with jaws 31 as in Fig. 4 to the positions of engagement of their reverse check sides 36a with jaws 31 as in Fig. 7, whereby to index the keys 28 in registry with the respective ends of the opening 30 and permit the pin to be freely withdrawn from the screw.

The depth of the dogs 37 is just sufficient to insure adequate locking. Preferably, it is only a small fraction of the pitch of thread 33, so that only a small portion of a turn of the pin is required for drawing the dogs 37 into or withdrawing them from the opening 30. For example, the depth of the dogs may be only one quarter of the screw thread pitch, thus providing for complete insertion and withdrawal of the dogs into and out of the opening 30 with a quarter turn of the pin A. With another quarter turn being utilized in rotating the pin through its lost motion stage of movement relative to the screw, a complete fastening or unfastening operation can be effected in a trifle over 180 degrees of rotation.

As one of its important advantages, the invention provides for maximum area of inter-engagement between keys 28 and jaws 31. Inter-engaging faces of the keys 28 and jaws 31 are flat and lie in planes transverse to the axis of the fastener, whereby intimate face to face contact may be established between the keys and jaws throughout substantially the entire areas of the jaws. Thus, I have provided for long-lasting dimensional stability in the fastener, substantially unaffected by wear between the inter-engaging faces.

This maximum area of contact is provided for by the peculiar novel shape of the keys 28 and jaws 31. The side walls 40 of the jaws 31 are convexly curved so as to define the opening 30 of minimum width at the center and gradually widening toward its respective ends. Correspondingly, the keys 28, which collectively define a locking end having the same shape as the opening 30, have a minimum diameter at the waist or central portion of this locking end and gradually widen toward their ends where they engage the jaws 31. This widening of the keys 28 at their ends provides for maximum area of contact between the keys and jaws.

The ends of keys 28, and, correspondingly, the ends of openings 30 are accurately shaped as portions of cylindrical surfaces. The cylindrical surface in the case of the opening 30 is the bore 32 of the screw B. In the case of the key 28, it is an extension of the cylindrical surface of pin shank 25. This is important, since it reduces to some extent the complexity and expense of machining the locking end of the pin A.

The reverse check faces 36a of wings 34 form a continuation of the cylindrical surfaces which define the side faces 36b of keys 28. One side of each locking dog 37 likewise constitutes an extension of one of these cylindrical surfaces. The driving faces 35a of wings 34, and the other sides 35b of the locking dogs 37 collectively define common cylindrical surfaces of the same radius as the side faces 36a, 36b. This use of a common radius for all of these faces is an important factor in the relative simplicity of the machining operations by which the pin is fabricated, as will be more fully explained hereinafter. It also makes it possible for both the driving faces 35a and the reverse check faces 36a, as well as both sides of the dogs 37, to snugly fit the side faces 40 of jaws 31. Because of the common radius of the faces 35a, 36a etc., the cross section through dogs 37 as shown in Fig. 5, displays a completely symmetrical four sided figure with identical concave sides.

An important advantage of this characteristic is the fairly simple method by which the multiple faces of keys 28, dogs 37 and winged neck 29 are readily produced. This leads to a discussion of the

*Method of manufacture*

Figure 12:
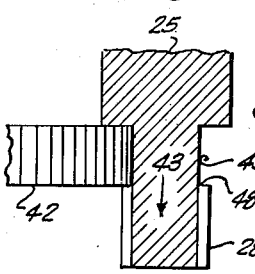
Fig. 12 is an axial sectional view illustrating the same step.
Figure 13:
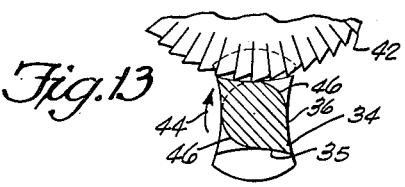
Fig. 13 is a transverse sectional view illustrating a subsequent step in the manufacture of the locking pin.

Referring now to Figs. 11 to 15 inclusive, the above described characteristics can be machined into the pin A by starting with a simple headed blank of cylindrical bar stock. The head at 23 and screw driver slot 41 which receives any handy screw driving tool such as a coin or a conventional screw driver for transmitting rotation to the pin may be forged into the pin by a conventional heading or upsetting process. The headed blank is then suitably supported in a chuck (not shown) and is fed axially against a rotating milling cutter 42, as shown in Fig. 12, the movement of the blank being indicated by arrow 43. The blank is located with its axis on the common plane of the center of rotation of the cutter 42, so that the concave face 36, symmetrically related to the axis of the blank, is milled out. The faces 36 later become the reverse check faces 36a of wings 34 and the corresponding faces of locking dogs 37, as well as the side faces 36b of keys 28.

The limit of axial feeding of the blank between cutter 42 determines the position of the end of shank member 25. When this position is reached, relative axial movement between the blank and the cutter 42 is arrested and, while such axial movement is arrested, the blank is rotated as indicated by arrow 44 in Fig. 13. In the alternative, the blank may be held stationary while the axis of the rotating cutter 42 is moved orbitally around the blank. Correspondingly, instead of the axial movement of the blank in the first stage of operation shown in Figs. 11 and 12, the blank may be held stationary and the cutter moved axially. The relative rotation between blank and cutter while relative axial movement is arrested produces a circumferential channel which becomes the annular space 45 between the lug 28 and the end of the shank 25. Also, during the next stage of fabrication, the reduced neck 29 is formed with concave, quarter cylindrical side walls 46, diametrically opposed to each other and definding the narrow central portion of neck 29, of cylindrical form, rotatable between the jaws 31 to provide the lost rotary motion between the pin and the screw. The quarter round surfaces 46 are formed by the peripherial cutting faces of the cutters 42, while the end face of shank 25 and the engaging faces 48 of keys 28 are formed by the flat sides of cutters 42.

At the end of the relative rotation between the blank and the cutter 42, the periphery of the cutter produces the driving surface 35a of a wing 34. When the relative rotation between the blank and the cutters is arrested, the blank is again moved axially with reference to the cutter (or the cutter is moved axially with reference to the blank) in a direction reverse to that of the initial stage of operation, as indicated by arrow 47 in Fig. 14. This movement extends the side face 36 down to the engaging shoulder or face 48 of key 28, forms the engaging face 48, and forms the side face 35b (Fig. 15) of dog 37. This entire sequence of operations is then repeated on the other side of the pin.

The finished pins are hardened by heat treating.

It will now be seen that with the use of machine screw technique in producing relative rotation and axial movement between the blank and the cutters, the locking head of the pin can be produced in a substantially continuous operation in several stages without re-chucking the blank.

It will now be apparent that high speed milling practice, rapidly executed to produce a generated shape, may be utilized in the fabrication of the pin.

The screw B is fabricated by standard screw machine and broaching practice. From solid bar stock, cylindrical blanks will be cut to the desired axial dimensions, a pilot hole drilled in the blank at its axis, the blank will then be counterbored to provide bore 32, leaving a flange for the formation of jaws 31, and the opening 30 will then be formed by broaching out the pilot opening in this flange, using a broach conforming in shape to the shape of the opening 30.

The bore 32 is formed by an end milling type of cutter which will produce the flat locking faces of the jaws 31. The depth of this counterboring operation determines the thickness of the jaws 31.

The external thread is then machined upon the screw B, and the screw is then engaged under pressure between jaws which deform it to the elliptical shape shown in Fig. 9. Thus deformed, the screw is hardened by heat-treating.

Figure 10:
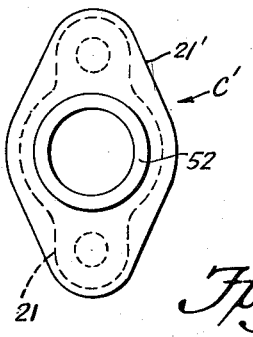
Fig. 10 is a view illustrating an early step in the fabrication of the screw.
Figure 10A:
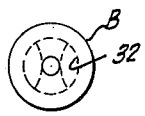
Fig. 10a is a view illustrating an early step in the fabrication of the nut.
Figure 11:
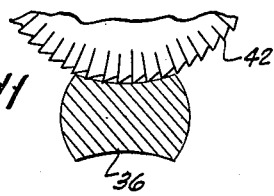
Fig. 11 is a transverse sectional view illustrating an early step in the manufacture of the locking pin.

The nut C is formed by forging or heading a blank C¹ (Fig. 10a) having the cylindrical collar 52 and a wide, thick flash 21' from which apertured ears 21 are later formed by a trimming and piercing operation. In this trimming operation, the flash inside the collar 52 is punched out, the excess material is trimmed away from the periphery of ears 21, and openings are pierced in the ears. The nut is then drilled, counterbored and tapped in accordance with conventional practice.

In the fabrication of the fastener, the screw B is preassembled in the nut C. To fit the screw into the nut, it is expanded back to its original cylindrical form by the insertion of a suitable wedge-shaped spreading tool 54 into the opening 30. Thus expanded to cylindrical form, it is screwed into the nut C, the expanding tool 54 is withdrawn, and it thereupon engages the threads at 33 of the nut with an expanding pressure at points on its major elliptical axis. This expanding pressure will, throughout the life of the fastener, maintain sufficient frictional engagement between the screw and the nut to prevent undesired rotation.

Briefly reviewing the operation of the device, and its application to a commercial use such as that of fastening an access cover 24 (Fig. 1) to the wing structure 20 of an aircraft engine, the nut C will ordinarily be secured to the wing structure 20 by rivets as shown in Fig. 3 with the opening defined by its flange 53 registering with the opening 27 of the structure 20. To fasten the cover 24 to the structure 20, it is laid thereon with its openings 26 registering with openings 27 of the structure. Pins A are then inserted through openings 26 and 27 and are rotated while very light axial pressure is exerted against them until the keys 28 find their way through the opening 30. The pin is then rotated in the locking direction, driving faces 35a of wings 34 engaging side faces 40 of jaws 31 to rotate and advance screw B in nut C and to dispose locking lugs 37 in positions to enter opening 30 as the screw B advances away from shank 25 of the locking pin. Continued rotation of the pin will advance screw B into locking engagement between its engaging faces (under faces 56 of jaws 31, Fig. 8) and the locking faces 48 of keys 28. Dogs 37 will now be drawn into openings 30 and will cooperate with wings 34 to establish a two-way locking engagement with walls 40 to provide, as indicated in Fig. 5, a complete lock against relative rotation between pin A and screw B in either direction. Screw B being yieldingly restrained against rotation by nut C, pin A will thereby be held against rotation, and the parts will thus be restrained against any rotation resulting from vibration or other accidental causes. Any desired degree of tightness of the attachment between members 20 and 24 may be attained by rotating pin A in the locking direction to set up axial compression forces between keys 28 and jaws 31 with corresponding tension forces in pin 25 drawing head 23 tightly against its seat in the member 24 and applying pressure through screw B and nut C to press member 20 against member 24.

When it is desired to release the fastener, it is rotated in the unlocking direction, such retrograde rotation being transmitted through dogs 37 to the screw B until the latter has been backed off to release the dogs 37 from opening 30, whereupon the rotation of screw B will cease and further retrograde rotation of pin A will cause it to make a quarter turn relative to screw B, aligning the keys 28 with the ends of openings 30 as shown in Fig. 7 and permitting the pin to be withdrawn.

Figure 16:
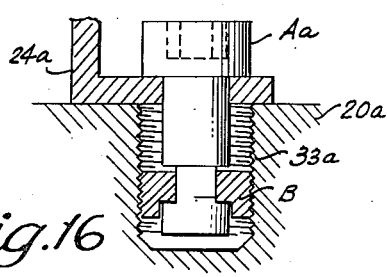
Fig. 16 is a transverse sectional view of a pin and screw assembly embodying a modified form of the invention.

The form of the invention described above utilizes two sets of locking devices 28 and 27, symmetrically shaped and arranged, and giving substantially maximum area of interlocking engagement between faces 48 and 56. However, it is to be understood that the two sets of locking elements need not necessarily be utilized, it being possible to use either a smaller or larger number of sets. For example, it is entirely feasible to utilize a single locking key.

Where it is desired to secure a plate member or bracket to a body too thick to pass a securing element through it, the nut C may be eliminated as a separate part, and its function may be assumed by a threaded bore in the body. For example, as shown in Fig. 16, a threaded bore 33a is provided in a heavy body 20a (e. g. a heavy casting) and the screw B is threaded into the bore 33a. The screw B and pin Aa are identical to the screw B and pin A of Figs. 1–7, except that the pin Aa is shown as having a socket type head. Bracket 24a is secured to casting 20a by means of pin Aa. The operation of the fastener is the same as in Figs. 1–7.

Figure 17:
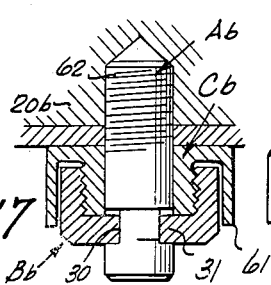
Fig. 17 is an axial sectional view of another modified form of the invention.
Figure 18:
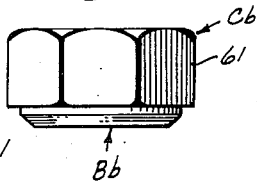
Fig. 18 is a side view of the nut of Fig. 17.

In the case where it is desirable to incorporate a stud permanently anchored in one of the members to be secured together, the device shown in Fig. 17 may be employed. In this case the pin Ab is fixed in a heavy body 20b (e. g. a casting) and the nut Cb is rotatable. The screw Bb has an internal thread (instead of the external thread of screw B) and the nut Cb has an external thread meshing therewith. The nut Cb has a skirt 61 which, as shown in Fig. 18, has flat external faces or other means to afford a wrench hold on the nut.

The screw Bb has jaws 31 defining an opening 30 the same as in Figs. 1–7, and the pin Ab is the same as pin A except for its threaded end 62 or other means for anchoring it in body 20b. The jaws 31 cooperate with pin Ab in the same manner as in Figs. 1–7, except that rotative torque comes from nut Cb instead of from pin Ab. As nut Cb is rotated, screw Bb will rotate until it is stopped by neck 29 and will then be drawn axially along neck 29 to a locking position. Reverse rotation of nut Cb will first draw screw Bb axially back to a position where it may rotate a quarter turn, and will then index the screw to the unlocking position.

A primary advantage of the invention of Figs. 1–7 is the shear-bearing capacity of the solid shank 25 in close-fitting openings 26 and 27. Where member 27 is a thin sheet, shear bearing surface is provided by the bore wall of flange 53, which is of the same diameter as openings 26, 27. This is the preferred embodiment of the invention.

I claim:

1. In a quick release, positive lock fastener for separably joining a pair of members having alignable openings therein, a nut having means for securing the same to one of said members in axial alignment with the opening therein; a screw of collar form threaded into said nut, said screw having an inwardly projecting jaw partially defining a non-circular aperture therein; and a rotatable fastener pin having a shank, a non-circular locking end insertible through said aperture and engageable with said jaw, and a reduced neck connecting said locking end to said shank and receivable in said aperture, said neck being shaped for limited rotation in said aperture and adapted to engage the wall of the aperture at a limit of such rotation, whereby to establish a driving connection between the pin and the screw to advance the screw in the nut and draw said jaw into engagement with said locking end, said locking end being provided with a dog projecting axially toward said shank, adapted to clear said jaw when the screw is retracted, so as to permit said limited rotation, and to be drawn into said aperture and engage said jaw when the screw is advanced, whereby to lock the screw to the pin against relative rotation in either direction.

2. In a quick release, positive lock fastener for separably joining a pair of members one having an opening and the other having an internally threaded opening; a screw of collar form threaded into said internally threaded opening, said screw having an inwardly projecting jaw partially defining a non-circular aperture therein; and a rotatable fastener pin having a shank, a reduced neck, a non-circular locking end connected to said shank by said reduced neck and axially spaced from said shank to define an annular space around said neck, said locking end being insertible through said aperture, said neck being receivable in said aperture and of a non-circular cross-sectional shape permitting restricted rotation thereof in the aperture and including a stop to engage the jaw at the limits of such restricted rotation to orient the pin and screw in separable relation at one such limit and in connected relation at the other limit, and also to establish a driving connection between the pin and screw, said locking end having a locking dog in the form of a shoulder projecting axially therefrom into said annular space and engageable with the jaw to prevent relative rotation between the pin and screw in one direction while said stop prevents relative rotation in the other direction, whereby said pin and screw are locked against relative rotation in either direction, said driving connection functioning to effect advancement of the screw in the nut to draw the locking head tightly against said jaw and establish the inter-engagement of said dog and jaw which locks the fastener, and to effect retraction of the screw to a position where said dog will clear said jaw and allow the pin to rotate relative to the screw to the releasing position.

3. A fastener as defined in claim 2, wherein said locking end is defined on at least one side by a concave face of circular cross-section.

4. A fastener as defined in claim 2, wherein said locking end is defined on at least one side by a concave face of circular cross-section and wherein said stop is defined on one side by a concave face constituting a continuation of a portion of said locking end face, of the same radius.

5. A fastener as defined in claim 2, wherein said locking end is defined on at least one side by a concave face of circular cross-section, said stop is defined on one side by a concave face constituting a common-radius continuation of said locking face, and wherein the shoulder side of said dog and the other side of said stop constitute portions of a common concave surface of circular cross-sectional shape.

6. A fastener as defined in claim 2, wherein said locking end is defined between opposed cylindrical convex end faces and opposed cylindrical concave side faces, and wherein there are two stops of roughly triangular cross-sectional shape, diametrically opposed, each having one face that is concave, cylindrical and coaxial with one of said side faces, and another face that is concave and cylindrical and disposed at an angle of 90° about the axis of the pin with reference to said side faces.

7. A fastener as defined in claim 2, wherein said locking end is defined between opposed cylindrical convex end faces and opposed cylindrical concave side faces, and there are two stops of roughly triangular cross-sectional shape, diametrically opposed, each having one face that is concave, cylindrical and coaxial with one of said side faces, and another face that is concave and cylindrical and disposed at an angle of 90° about the axis of the pin with reference to said side faces, and wherein there are two locking dogs of roughly triangular shape, each having one side formed as a continuation of said one face of one stop and its other side formed as a continuation of said other face of the other stop.

8. A fastener as defined in claim 2, wherein said reduced neck is of a shape including a cylindrical central portion defined between opposed cylindrical faces and two wedge-shaped, diametrically opposed wings constituting stops, said wings being defined between intersecting cylindrical surfaces tangent to but of reverse curvature with reference to the cylindrical faces of said central portion, and wherein the cross-sectional shape of said neck at said dogs is that of a symmetrical four sided figure approximating a square, with equal radius, concave sides.

9. In a quick release, positive lock fastener for separably joining a pair of members, a nut for attachment to one of said members, a screw of collar form having a threaded portion for coaction with said nut, said screw having an inwardly projecting jaw partially defining a non-circular aperture therein; and a rotatable fastener pin having a shank, a reduced neck, a non-circular locking nut connected to said shank by said reduced end and axially spaced from said shank to define an annular space around said neck, said locking end being insertible through said aperture, said neck being receivable in said aperture and of a non-circular cross-sectional shape permitting restricted rotation thereof in the aperture and including a stop to engage the jaw at the limits of such restricted rotation to orient the pin and screw in separable relation at one such limit and in connected relation at the other limit, and also to establish a driving connection between the pin end screw, said locking end having a locking dog in the form of a shoulder projecting axially therefrom into said annular space and engageable with the jaw to prevent relative rotation between the pin and screw in one direction while said stop prevents relative rotation in the other direction, whereby said pin and screw are locked against relative rotation in either direction, said driving connection functioning to effect advancement of the screw in the nut to draw the locking end tightly against said jaw and establish the inter-engagement of said dog and jaw which locks the fastener, and to effect retraction of the screw to a position where said dog will clear said jaw and allow the pin to rotate relative to the screw to the releasing position.

10. A quick release, positive lock fastener for separably joining a pair of members, comprising three fastener parts, namely, a pin, a nut and a screw; said pin and nut comprising two parts, one of which has means for securing the same to one of said members and the other of which is adapted to have torque applied thereto for actuating the fastener; said screw being of collar form having a threaded portion for coaction with said nut, and having an inwardly projecting jaw partially defining a noncircular aperture therein; said pin having a shank, a reduced neck, a noncircular locking end connected to said shank by said reduced neck and axially spaced from said shank to define an annular space around said neck, said locking end being insertable through said aperture, said neck being receivable in said aperture and being of a noncircular cross-sectional shape permitting restricted relative rotation between said pin and screw and including a stop to engage the jaw at the limits of such restricted relative rotation, to orient said pin and screw in separable relation at one limit and in connected relation at the other limit of such restricted rotation, said locking end having a locking dog in the form of a shoulder projecting axially therefrom into said annular space and engageable with the jaw to prevent relative rotation between the pin and screw in one direction while said stop prevents relative rotation between the pin and screw in the other direction, whereby said pin and screw are locked against relative rotation in either direction; the said part which is adapted to receive torque being adapted in one stage of rotation in one direction, to effect the limited relative rotation between the pin and screw and in another stage of such rotation to effect relative threading movement between the screw and the nut for drawing the locking head tightly against the jaw and establish the interengagement between said dog and jaw which locks the fastener, and, upon reverse rotation, to effect retraction of the screw to a position where said dog will clear said jaw and allow the said relative rotation between the pin and screw to the releasing position.

11. A fastener as defined in claim 10, wherein the nut is the member for receiving torque, and is in the form of an externally threaded collar portion, a web extending radially outwardly from one end thereof and a skirt extending axially from said web, spaced radially outwardly from said collar portion and rotatably telescoped over said screw and having external faces for coaction with a wrench, said collar portion rotatably receiving said pin.

GEORGE S. WING.

REFERENCES CITED

The following references are of record in the file of this patent:

UNITED STATES PATENTS

| Number | Name | Date |
|---|---|---|
| 2,414,870 | Harding | Jan. 28, 1947 |
| 2,486,411 | Huelster | Nov. 1, 1949 |
| 2,514,113 | Zahodiakin | July 4, 1950 |